United States Patent [19]

Beyers, Jr.

[11] 4,027,280

[45] May 31, 1977

[54] TRANSDUCER DRIVE CIRCUIT FOR REMOTE CONTROL TRANSMITTER

[75] Inventor: Billy Wesley Beyers, Jr., Greenfield, Ind.

[73] Assignee: RCA Corporation, New York, N.Y.

[22] Filed: May 23, 1975

[21] Appl. No.: 580,678

[52] U.S. Cl. .............................. 340/15; 340/16 C; 358/194

[51] Int. Cl.[2] .............................. H04B 11/00

[58] Field of Search .............. 340/15, 16 C, 147 R, 340/384 E; 178/DIG. 15; 310/8.1

[56] References Cited

UNITED STATES PATENTS 3,432,691 3/1969 Shoh .............................. 310/8.1

*Primary Examiner*—Maynard R. Wilbur
*Assistant Examiner*—T. M. Blum
*Attorney, Agent, or Firm*—Eugene M. Whitacre; Peter M. Emanuel

[57] ABSTRACT

A wide bandwidth, ultrasonic frequency transducer drive circuit incorporates a first unidirectional signal path from a source of drive signals to the transducer. A second unidirectional signal path from the source of drive signals couples signals away from the transducer. A circuit resonant with the transducer causes a relatively high signal voltage to be developed across this transducer.

8 Claims, 4 Drawing Figures

TRANSDUCER DRIVE CIRCUIT FOR REMOTE CONTROL TRANSMITTER

Figure 1:
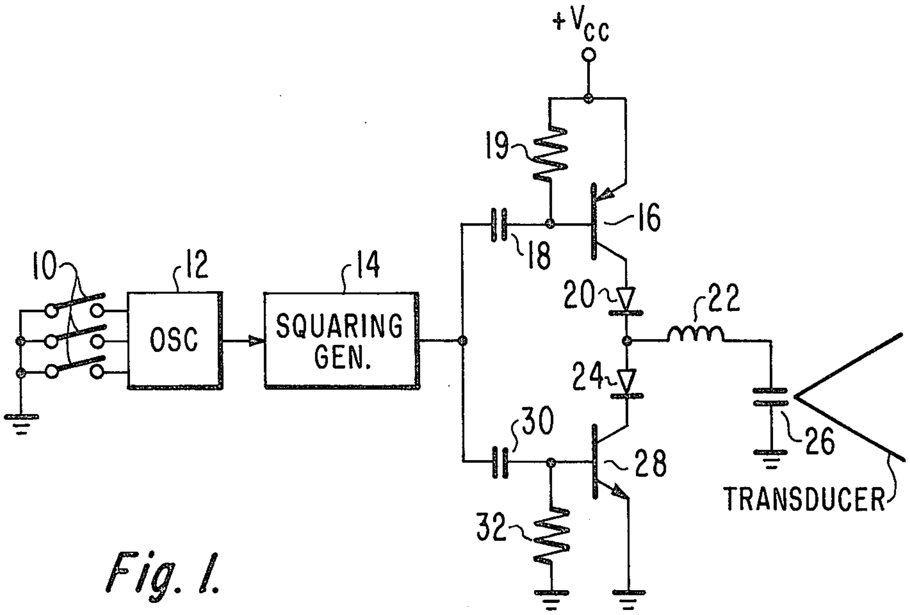

This invention relates to ultrasonic remote control transmitters and more particularly to an ultrasonic transducer drive circuit having broad bandwidth and low power dissipation.

Remote control of, for example, television receivers is generally accomplished by utilizing a small hand-held transmitter for transmitting control signals to a receiver located within the television cabinet. The remote control apparatus may include a plurality of push buttons which may be depressed to cause transmission of appropriate signals on, for example, a respective plurality of ultrasonic frequencies for which the remote control receiver is responsive. Control functions such as channel change, volume up and down, color up and down, tint and brightness may be controlled by ones of these push buttons. In one type of system, depression of each of the plurality of transmitter push buttons causes the transmitter to transmit a different frequency. Hence, if there are ten functions to be controlled, the transmitter would provide outputs at ten separate frequencies. Generally, the frequencies provided by the transmitter are within the ultrasonic frequency range, for example, in the range of 20 to 55 KHz. Hence, the transmitter generally utilizes an ultrasonic transducer having a relatively broad bandwidth for transmitting the ultrasonic signals. A transducer circuit having relatively broad bandwidth generally has a relatively low Q. One type of transducer that has a relatively broad bandwidth is a capacitor type of transducer. In a capacitor type transducer, ultrasonic vibration is generated by the change in charge across associated capacitor plates.

In order to assure proper remote control operation from distances of, for example, up to 30 feet, it is desirable to provide a transmitter which will provide sufficient signal output to cause positive actuation of the associated remote control receiver. High power, wide bandwidth remote control transmitters generally require a substantial amount of energy from their internal battery power source. In order to preserve the battery energy and effect a long battery life, it is desirable to construct energy efficient transmitter circuitry. One area of transmitter circuit in which energy may be conserved is in the transducer drive circuit. In some prior systems, signal energy is provided to a capacitive type of transducer during each half cycle of the transmitter wave. Energy that is provided to this capacitive transducer is thereafter transferred to ground, discharging the energy provided thereto.

An improved transducer drive circuit in which a relatively small amount of energy is dissipated and which greatly increases the signal voltage thereacross includes a squaring means for converting signals from an ultrasonic frequency source to rectangular shaped signals having first and second states. A first current conducting means is coupled to this squaring means and operates to provide current to a transducer during the periods of time when it receives signals of a first state. A second current conducting means is further coupled to the squaring means and causes current to flow from the transducer during the period of time when signals from the squaring means are in a second state. An inductor is interposed between the transducer and the first and second current conducting paths for causing the current flowing from the transducer to ring and reverse direction.

Figure 2A:
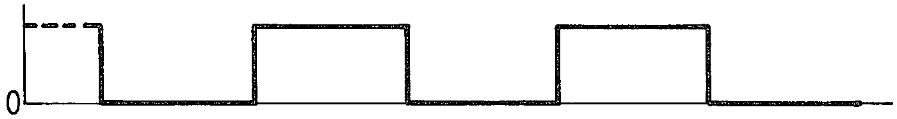
Figure 2B:
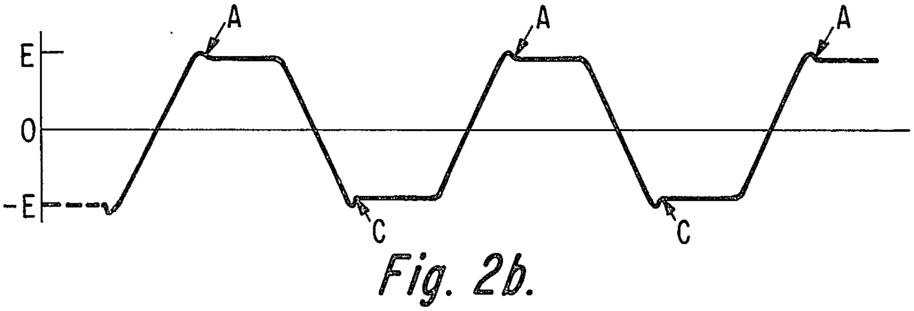
Figure 2C:
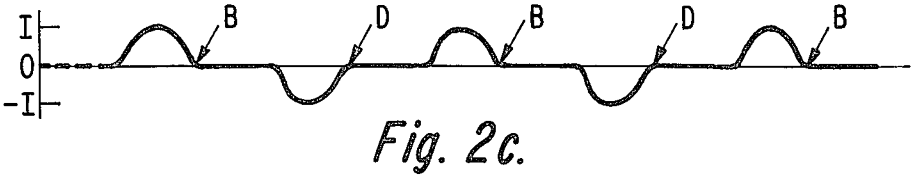

A better understanding of the present invention may be derived with reference to the following description when taken with the drawings in which:

FIG. 1 is a partial block and schematic diagram of an ultrasonic transmitter incorporating the present invention; and FIGS. 2a–2c show representations of waveforms utilized within the apparatus of FIG. 1.

With reference to FIG. 1, there is shown a series of switches 10 coupled to an oscillator 12. Signals provided by oscillator 12 are in turn coupled to a squaring generator 14. Squaring generator 14 provides signals through a first path to a transistor 16. A capacitor 18 is coupled between the base electrode of transistor 16 and an output terminal of generator 14. Transistor 16 is arranged in a common emitter configuration having a biasing resistor 19 coupled between a base electrode and a source of supply voltage. A diode 20 has an anode electrode coupled to a collector electrode of transistor 16 and a cathode electrode coupled both to an inductor 22 and an anode of a second diode 24. A capacitive type of transducer 26 receives signals provided through inductor 22. Signals provided by generator 14 are further coupled through a second path to a transistor 28. A coupling capacitor 30 is interposed between the base electrode of transistor 28 and the output terminal of generator 14. A biasing resistor 32 is coupled between ground and the base electrode of transistor 28. The collector electrode of transistor 28 is coupled to a cathode of the aforementioned diode 24.

In the operation of the above-described circuit, a selected one of switches 10 is depressed to cause transmission of remote control signals by the apparatus of FIG. 1 to an associated remote control receiver (not shown). Although three push buttons are illustrated for switches 10, it will be appreciated that any number of switches corresponding to a desired number of remote control functions may be utilized. Ones of the plurality of switches 10 are coupled to oscillator 12 which is arranged to provide, for example, a different frequency for each one of the control functions operative by the respective ones of switches 10. Although this apparatus is illustrated as providing a plurality of output frequencies corresponding to the respective ones of switches 10, it will be appreciated that other oscillator arrangements, for example, digitally signal encoded arrangements may work equally well with the subject apparatus.

Signals provided at the output of oscillator 12 may be in the range of, for example, 20 to 55 KHz. These signals are coupled to a squaring generator 14 wherein the signals are converted to bilevel signals or square wave type signals. Generator 14 may comprise a series of high gain amplifier stages wherein applied sinusoidal input signals from oscillator 12 are converted to signals corresponding to a saturated state and a cut-off state. FIG. 2a illustrates the square wave type of signals that are provided by generator 14. Signals provided by generator 14 are coupled to the base electrode of PNP type transistor 16 via capacitor 18 which is used to block DC voltage levels. It will be appreciated that capacitor 18 may be eliminated in instances where appropriate DC output voltages are provided from generator 14.

Transistor 16 conducts and transistor 28 is cut off when the applied input signal from generator 14 changes from a high state to a low state of, for example, 0 volts. Current conduction through transistor 16 causes current to flow from the supply source $V_{cc}$ through diode 20 and inductor 22 to the capacitive transducer 26. FIG. 2*b* illustrates the waveform of the voltage across capacitor 26. During the interval when the applied signal is low, capacitor 26 charges towards a voltage of +E volts (see A of FIG. 2*b*). In order to assure that capacitor 26 reaches a maximum charge within a half cycle of applied signal from generator 14, the resonant frequency of inductor 22 and capacitor 26 is adjusted to be higher than twice the highest frequency provided by oscillator 12. Upon capacitor 26 reaching a maximum charge, the LC circuit comprised of capacitor 26 and inductor 22 begins to ring. As the ringing begins, the resultant current flow reverses. FIG. 2*c* illustrates the waveform of the current flow into capacitor 26. As the current reverses, diode 20 becomes back-biased inhibiting any current flow therethrough. Current does not flow through diode 24 at this time since transistor 28 is biased off during a low half cycle of input signal from generator 14. Hence, at the termination of the first half cycle, i.e., the first portion of the signal from generator 14 wherein the signal is low, capacitor 26 is charged to about +E volts. In the second half cycle of output signal from generator 14 (when the output signal is high), transistor 16 is biased off and transistor 28 is caused to conduct. As in the case of capacitor 18, signals coupling capacitor 30 may be eliminated by supplying appropriately voltages from the output signal of generator 14.

When transistor 28 is turned on, as in the second half cycle of the applied input signal, current begins to flow from capacitor 26 to ground. This current flow causes the LC circuit comprised of inductor 22 and capacitor 26 to ring. The ringing continues until the voltage across capacitor 26 charges to substantially −E volts (see point C of FIG. 2*b*). When the voltage across capacitor 26 reaches approximately −E volts, the current through inductor 22 reverses causing diode 24 to cease conducting and terminate current flow from capacitor 26 (see point D of FIG. 2*c*). Hence, at the end of the second half cycle of applied input signal, the voltage across capacitor 26 is approximately −E volts. In the third half cycle of applied input signal, transistor 16 again conducts causing the LC circuit of inductor 22 and capacitor 26 to ring. As the ringing occurs, the voltage across capacitor 26 changes from −E to approximately +E, at which time the current through inductor 22 again reverses causing a cessation of current flow through diode 20 and retention of a charge of approximately +E volts on capacitor 26.

Illustratively, when the apparatus of FIG. 1 is operated with a 9-volt supply ($V_{cc}$), the peak-to-peak voltage generated across capacitor 26 may be in the order of about 60 volts. This relatively high voltage, in excess of two times $V_{cc}$, is due to the relatively low impedance path between $V_{cc}$ and the LC circuit of inductor 22 and capacitor 26, and the relatively high Q of this LC circuit.

Hence, by utilizing the above-described circuitry, signal energy utilized to drive the transducer 26 may be conserved and a peak-to-peak voltage across the transducer that is substantially greater than the peak-to-peak voltage of the driving signal provided.

What is claimed is:

1. In an ultrasonic transmitter for generating ultrasonic frequency signals and having a capacitive type of output transducer, apparatus for providing signal energy to said transducer comprising:

an oscillator for generating said ultrasonic frequencies;

squaring means coupled to said oscillator for providing signals having substantially first and second voltage stages;

a first current conducting means coupled to said squaring means and responsive to signals of said first voltage state for providing current to said transducer to charge the capacitance thereof;

a second current conducting means coupled to said squaring means and responsive to signals of said second voltage state for causing current to flow from said transducer to discharge the capacitance thereof; and an inductor serially interposed between said transducer and said first and second current conducting means and proportioned with respect to the capacitance of said transducer to form a series tuned circuit resonant at a frequency greater than said oscillator ultrasonic frequencies so that the capacitance of said transducer reaches a maximum charge during said first voltage state.

2. Apparatus according to claim 1 including:

a first diode interposed between said first current conducting means and said transducer in a direction for passing current from said current conducting means to said transducer; and a second diode interposed between said second current conducting means and said transducer, in a direction for carrying current away from said transducer.

3. Apparatus according to claim 1 wherein said inductor is tuned with respect to the capacitance of said transducer to a frequency higher than at least twice the highest frequency provided by said oscillator.

4. Apparatus, comprising:

means for generating a signal having a predetermined frequency;

squaring means coupled to said signal generating means for providing signals having substantially first and second voltage states;

utilization means having a capacitance associated therewith;

a first current conducting means coupled to said squaring means and responsive to signals of said first voltage state for causing current to flow to said utilization means;

first unidirectional conducting means serially interposed between said first current conducting means and said utilization means and poled in a direction for passing current from said first conduction means to said utilization means;

second current conducting means coupled to said squaring means and responsive to signals of said second voltage state for causing current to flow from said utilization means;

second unidirectional conduction means serially interposed between said second current conducting means and said utilization means and poled in a direction for carrying current away from said utilization means to said second current conducting means; and an inductor serially interposed between said utilization means and said first and second unidirectional conduction means.

5. Apparatus according to claim 4 wherein said inductor is tuned with respect to the capacitance of said utilization means to a frequency greater than said predetermined frequency.

6. The apparatus recited in claim 5 wherein said utilization means includes a capacitive type of acoustic transducer and wherein said predetermined frequency is in the ultrasonic frequency range.

7. The apparatus according to claim 4 wherein said first current conducting means includes a first transistor of a first type and said second current conducting means includes a second transistor of a type opposite to that of said first type.

8. The apparatus according to claim 7 wherein said first unidirectional conducting device comprises a first diode and said second unidirectional conducting device comprises a second diode.

* * * * *

UNITED STATES PATENT OFFICE
CERTIFICATE OF CORRECTION

PATENT NO. : 4,027,280

DATED : May 31, 1977

INVENTOR(S) : Billy Wesley Beyers, Jr.

It is certified that error appears in the above-identified patent and that said Letters Patent are hereby corrected as shown below:

On the title sheet, under References Cited, insert

-- 3,305,824 2/67 Brooks et al. ........... 340/15 --

-- 3,673,555 6/72 Raudsep ................. 340/15 --

-- 3,681,626 8/72 Puskas .................. 318/116 --

Signed and Sealed this

*twenty-third* Day of *August 1977*

[SEAL]

*Attest:*

RUTH C. MASON
*Attesting Officer*

C. MARSHALL DANN
*Commissioner of Patents and Trademarks*